(12) United States Patent
Angermann et al.

(10) Patent No.: US 6,688,190 B2
(45) Date of Patent: Feb. 10, 2004

(54) MANUAL LEVER DRIVE FOR ADJUSTING DEVICES ON SEATS, IN PARTICULAR, MOTOR VEHICLES SEATS

(75) Inventors: Bernd Angermann, Remscheid-Lennep (DE); Dirk Angermann, Bergisch Gladbach (DE); Detlev Backert, Schorndorf (DE); Jürgen Stemmer, Remscheid (DE); Christoph Leibeling, Siegburg (DE); Rolf Schüler, Heiligenhaus (DE)

(73) Assignee: Keiper GmbH & Co., Kaiserslautern (DE)

( * ) Notice: Subject to any disclaimer, the term of this patent is extended or adjusted under 35 U.S.C. 154(b) by 0 days.

(21) Appl. No.: 10/026,425

(22) Filed: Dec. 19, 2001

(65) Prior Publication Data

US 2002/0053824 A1 May 9, 2002

Related U.S. Application Data

(63) Continuation of application No. PCT/EP01/03319, filed on Mar. 23, 2001.

(30) Foreign Application Priority Data

Apr. 20, 2000 (DE) .......................................... 100 19 854

(51) Int. Cl.$^7$ ................................................. G05G 5/06
(52) U.S. Cl. ........................... 74/529; 74/527; 297/367; 297/353
(58) Field of Search ........................ 74/529, 567, 569; 297/367, 368, 369, 216.13, 14, 353

(56) References Cited

U.S. PATENT DOCUMENTS

| | | | | |
|---|---|---|---|---|
| 4,295,682 A | * | 10/1981 | Kluting et al. .............. | 297/367 |
| 5,498,052 A | * | 3/1996 | Severini et al. ........... | 297/14 X |
| 5,522,643 A | * | 6/1996 | Matsuura .................... | 297/367 |
| 5,664,836 A | | 9/1997 | Takagi | |
| 5,927,809 A | * | 7/1999 | Tame .......................... | 297/341 |
| 6,209,955 B1 | * | 4/2001 | Seibold ................. | 297/216.13 |
| 6,220,666 B1 | * | 4/2001 | Ohya .......................... | 297/367 |
| 6,402,249 B1 | * | 6/2002 | Rohee et al. ............... | 297/367 |
| 6,447,066 B1 | * | 9/2002 | Chabanne et al. .......... | 297/367 |

FOREIGN PATENT DOCUMENTS

| | | | | |
|---|---|---|---|---|
| DE | 195 47 513 C1 | | 12/1997 | |
| EP | 0633169 A1 | * | 11/1995 | ................. 297/367 |
| EP | 0908349 | | 4/1999 | |
| FR | 2807366 | * | 12/2001 | ................. 297/367 |
| WO | 0055005 | | 9/2000 | |

* cited by examiner

Primary Examiner—Vinh T. Luong
(74) Attorney, Agent, or Firm—Friedrich Kueffner

(57) ABSTRACT

A manual lever drive for an adjusting device on a seat for converting a lifting movement into a discontinuous rotational movement has a support arm and a step-by step mechanism having an output member and an input member. The output member is configured to be coupled with a rotatingly moveable control member of the adjusting device. A transmission member is connected to the input member for torque transmission onto the input member. A manual lever is connected to the support arm so as to pivot about a first axis of rotation. The manual lever is configured to actuate the transmission member. The transmission member is arranged on the input member providing a second axis of rotation. A pivot angle of the manual lever imparts to the transmission member a pivot movement increasing a corresponding pivot angle of the second axis of rotation.

7 Claims, 6 Drawing Sheets

MANUAL LEVER DRIVE FOR ADJUSTING DEVICES ON SEATS, IN PARTICULAR, MOTOR VEHICLES SEATS

CROSS-REFERENCE TO RELATED APPLICATIONS

This application is a continuation of International Application No. PCT/EP01/03319, filed on Mar. 23, 2001.

BACKGROUND OF THE INVENTION

1. Field of the Invention

The invention relates to a manual lever drive for adjusting devices on seats, in particular, motor vehicle seats, for converting a lifting movement into a discontinuous rotation movement by employing a step-by-step mechanism.

2. Description of the Related Art

In today's vehicles, self-locking gears or ratchet gears are used for adjusting different positions, such as, for example, the slant adjustment of the back rest, the seat height adjustment or the adjustment of the seat surface slant. Self-locking gears or ratchet gears, for example, in the form of simple planetary gears, are able, when configured accordingly, to receive loads occurring possibly in an accident situation, independent of whether at the moment of the accident an adjustment process was carried out or not. In many cases, the adjustment in the end is carried out by a rotational movement which however cannot be easily and comfortably performed because of lack of space. As an example, the problem in regard to operating the rotary adjuster for the back rest is mentioned in this context which is to be adjusted by an actuator hand wheel which is often arranged so closely to the inner parts of the car body that an ergonomic operation cannot be realized.

Step-by-step mechanisms for converting two-way alternating lifting movements into a discontinuous rotational movement are used already in many variations in the field of motor vehicle seats; frequently, ratchet gears and free wheel brake roller configurations are used. In order to realize an ergonomic operation, in many cases rotatory step-up or step-down gears are used after conversion of the lifting movement into the rotational movement in order to bring the forces and adjusting parameters into the required ratio relative to one another. A plurality of these employed mechanisms require for a correct function internal control paths for their activation; for example, in the case of ratchet gears a pawl must first be brought into engagement before the movement can be finally transmitted. Accordingly, of the entire movement to be provided by the operator only a minimal portion can be utilized for the actual adjustment so that the "total mechanical efficiency" decreases.

SUMMARY OF THE INVENTION

It is an object of the present invention to provide a manual lever drive for adjusting devices which eliminates the aforementioned disadvantages of known systems and with which particularly the initial rotational angle relative to the lifting angle introduced by the manual lever is enlarged.

In accordance with the present invention, this is achieved in that the output member of the step-by-step mechanism is coupled with a rotating adjusting member of the adjusting device while the input member of the step-by-step mechanism is connected to the transmission member actuated by the manual lever for torque transmission, wherein the manual lever is pivotably supported on a support arm and pivotable about a first axis of rotation and its respective pivot angle imparts to the transmission member, arranged on a second axis of rotation, a pivot movement enlarging the corresponding rotational angle of the second axis of rotation on which the input member of the step-by-step mechanism is arranged.

For the transmission of the travel stroke or of the rotational angle, a lever drive, which can be referred to as a kinetic transmission, is connected upstream of the conversion of the lifting movement into a rotational movement; this provides, on the one hand, a very simple inexpensive realization and, on the other hand, with a corresponding selection of the transmission ratio, the control path required in the downstream system is also transmitted so that with regard to the actual actuation element the ratio of effective path to empty run is improved. In this connection, the actuation of such a lever drive can be configured, even for minimal space availability, in a comfortable way. Important in connection with the present solution are the two axes of rotation wherein on the first axis of rotation the manual lever is supported while the second axis of rotation represents the input member for the step-by-step mechanism, wherein the transmission member is fixedly connected with the input member forming the second axis of rotation, wherein the transmission member, in turn, can be actuated by the manual lever. As a result of the spacing of the axes of rotation from one another and as a result of the spacing of the second axis of rotation to the contact point of the manual lever on the transmission member, upon deflection of the manual lever by a certain angle a substantially greater angle results at the transmission member; consequently, a greater rotational angle on the second axis of rotation driving the step-by-step mechanism is realized. This reduces the empty run of the system which can be felt by the operator, the empty run being reduced according to the ratio of the aforementioned spacings.

In a first embodiment of the invention, the transmission member is a pivot lever fixedly connected to the input member which, by means of followers engaging opposed sides of the load arm of the manual lever, can be pivoted via the manual lever in one or the other rotational direction. In this connection, the followers of the pivot lever are advantageously pins projecting from the pivot lever and contacting control cutouts on the load arm of the manual lever.

In order to return the pivot lever after each switching step and thus also the manual lever into the initial position, the pivot lever has a return arm which is loaded by a stationary spring member and can thus be returned from any rotational position into a zero position. In this connection, the spring member can be in the form of a spiral spring secured on the housing of the step-by-step mechanism which engages with radially projecting spring fingers opposed sides of the return arm of the pivot lever.

Conventionally, the person adjusting the vehicle seat is seated on the seat and exerts, because of the person's weight, a load on the adjusting element against which the position is to be adjusted with fine adjusting steps. For this purpose, a correspondingly great actuation force is to be applied which, however, to the seat occupant appears to be normal and is thus acceptable. However, when the seat is to be adjusted from the outside, i.e., when the operator is stands next to the vehicle, it is desirable to obtain a quick adjustment of the seat with a few pumping movements. These two aforementioned typical different operating states require for a consequent realization also different transmission ratios. A high transmission ratio of, for example, 1:4 in the case of the unloaded seat to be quickly adjusted is desirable while, when the seat is loaded, a minimal transmission ratio is desired for a precise and fine adjustment. For realizing these possibilities, according to a further embodiment of the invention, the pivot lever, which is provided as the transmission member, is formed by a spring saddle and a lever bracket connected thereto which receives in a contacting way between its two spaced-apart spring legs an end portion of the load arm of the manual lever which end portion is provided with curved control surfaces. In this connection, the leaf-spring-like spring legs are fixedly correlated with the pivot lever wherein the contact between the control surfaces on the load arm of the manual lever and the spring legs of the pivot lever is closer to the second axis of rotation than the contact point between the control surfaces and the spring legs for a somewhat pivoted load arm of the manual lever. In this connection, in the case of a great counter load on the pivot lever, the loaded spring leg experiences such a load that bending of the spring about the clamping location occurs and, in cooperation with the correspondingly curved control surfaces on the end portion of the load arm of the manual lever, the spring leg experiences a displacement of the contact point away from the second axis of rotation to the rear. This causes an automatic change of the transmission ratio. The transmission changes load-dependently by using the aforementioned spring legs, which are mentioned only as an example and which form elastic elements within the transmission chain. Accordingly, for such an arrangement first the empty run angle of the step-by-step mechanism arranged downstream is passed quickly with minimal load and thus high transmission while the subsequent loading of the seat adjusting element leads to a continuous reduction of the transmission and thus an ergonomic operation.

A further transmission, which is adjustable automatically as a function of the load but in steps, is provided by a spring saddle secured on the lever bracket of the pivot lever which has a U-shaped support body having on the lateral legs engaging the load arm of the manual lever a multi-step spring bracket, respectively, between which the load arm of the manual lever with its contact sections engages continuously during its pivot movement. In this connection, each spring bracket can have, for example, three spaced-apart, successively arranged bracket sections which successively become narrower and engage the clamping projections on the load arm of the manual lever with increasing clamping force. Thus, three load stages are provided wherein the individual bracket sections are configured such that the force required for pressing apart the clamping sections increases with increasing spacing of the corresponding clamping section from the second axis of rotation. For smaller output moments, the force is transmitted via the bracket section closest to the axis of rotation so that for small loads a great transmission is realized. The force which can be transmitted at this location is limited by the opening force of the clamping section. When the output load increases to a level above the transmittable force on the first bracket section, the force is transmitted by the second bracket section which is farther removed from the axis of rotation. Accordingly, the transmission ratio at this location is smaller than before. The aforementioned statements apply analogously to the exemplary third contact location of the corresponding bracket section.

Instead of a transmission ratio which changes automatically upon actuation of the manual lever, it would also be possible to provide a device with which the transmission ratio is controlled in a targeted way. This could be realized, for example, in that on the manual lever a pushbutton is arranged which, by means of a sliding linkage, is connected to a connecting link bracket which is movable relative to the load arm of the manual lever as well as with regard to the bracket lever; by means of the connecting link bracket, when the user actuates the pushbutton, a constructively fixed transmission is activated in order to achieve, for example, a quick adjustment at a high transmission ratio.

The afore described embodiments of a transmission mechanism are arranged upstream of a step-by-step mechanism. Instead, an embodiment of a lever drive can be provided wherein the step-by-step mechanism is integrated in a special embodiment. For this purpose, according to an advantageous embodiment of the invention, the transmission member is comprised of a spool body fixedly connected on the shaft of the second axis of rotation and a wrap spring surrounding it. The wrap spring has spring ends formed as elastic follower arms between which a curved head of a load arm of the manual lever is received. In this connection, the follower arms of the wrap spring advantageously are loaded by one spring member, respectively, in the direction of a zero position, respectively. The elastic follower arms of the wrap spring serve however not only for controlling the coupling function but, at the same time, are formed as contact surfaces for the curved head on the load arm of the manual lever. These contact surfaces bend load-dependently and enable thus a high functional integration. For a pivot movement of the load arm of the manual lever in one direction, the wrap spring is closed for this movement direction and the spool body, for an initially high transmission, is entrained wherein the transmission ratio as a result of gliding of the curved head on the corresponding follower arm is adjusted automatically to the load. Upon pivoting of the load arm of the manual lever into the initial position, the previously driven follower arm is loaded by the restoring spring member such that the wrap spring is opened and the spool body is no longer driven but instead, as a result of friction in the downstream adjusting element of the seat, remains in this position. Since for a corresponding pivot movement of the load arm of the manual lever in the opposite direction, the aforementioned effect happens also, but in the opposite direction, a step-by-step mechanism acting in both directions is realized with integrated automatic load-dependent transmission.

A further embodiment of a step-by-step mechanism integrated with the lever drive can be preferably obtained in that the transmission member is formed by a drum-shaped cup fixedly connected to the shaft of the second axis of rotation and a wrap spring arranged therein. The wrap spring has spring ends in the form of follower arms radially projecting toward the drum-shaped cup center which are received in the receiving space of a pawl arranged on the load arm of the manual lever. Since depending on the configuration of the seat adjusting element, the inner friction is possibly reduced in comparison to the friction upon return of the wrap spring, it may be advantageous to employ two wrap springs acting in opposite directions, respectively, the configuration being identical in other respects, so that restoring springs can be eliminated, if needed.

DESCRIPTION OF THE PREFERRED EMBODIMENTS

Firstly, it is to be noted that in the illustrated embodiments only those components are illustrated which are required for understanding the subject matter of the invention. Neither the adjusting devices in the form of, for example, the aforementioned adjusting brackets for adjusting and moving the back rest of the vehicle seat or the seat-adjustment or the adjustment of the slant of the seat surface are therefore illustrated since they are not required for understanding the invention, nor are the details of a step-by-step mechanism which can be embodied as is known in the art.

Figures 1, 1A, 1B:
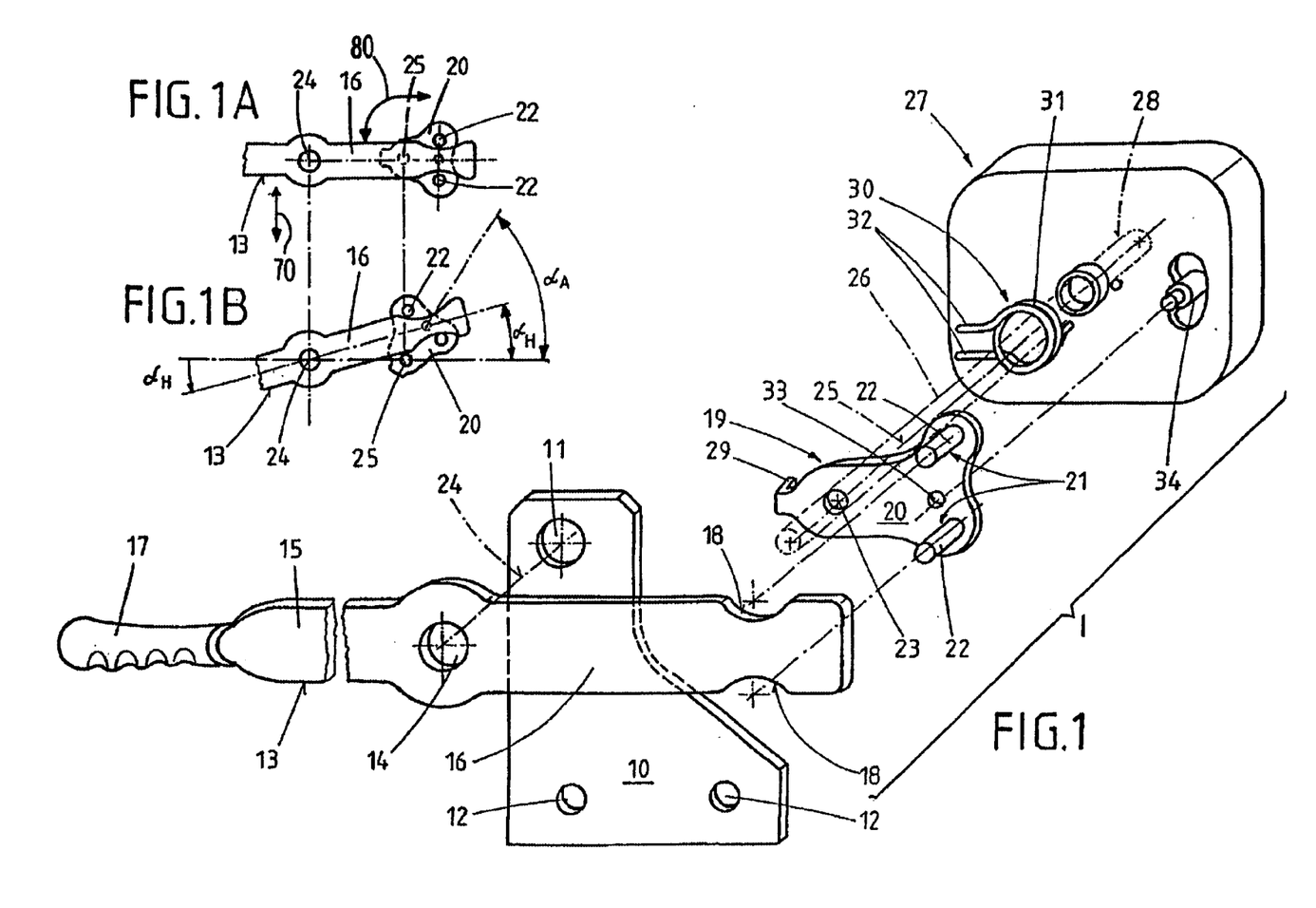
FIG. 1 shows a first embodiment of a manual lever drive for triggering an unchangeably transmitted adjusting stroke in a step-by-step mechanism, illustrated in a schematic, perspective illustration.
FIG. 1A shows the lever drive of FIG. 1 in a schematic side view at a reduced scale wherein the lever drive is in the zero position.
FIG. 1B shows the lever drive illustrated in FIG. 1A, also in a side view, in a position pivoted out of the initial (zero) position.

The lever drive 1 illustrated in FIG. 1 has a support arm 10 which is stationarily secured by means of fastening bores 12. Its bearing bore 11 is penetrated by a bearing bolt, not illustrated, which, in turn, supports rotatingly the receiving bore 14 of a manual lever 13. The manual lever 13 is formed as a two-arm lever relative to its point of rotation and has a force arm 15 provided with a grip part 17 which is separated by the receiving bore 14 from the load arm 16. At a certain spacing to the receiving bore 14, this load arm 16 has at its two longitudinal opposed sides control cutouts 18 which are engaged in a contacting way by followers 21 in the form of pins 22 of a pivot lever 20 acting as a transmission member 19. At a certain spacing to the plane of the pins 22 in the direction toward the first axis of rotation 24 defined by the centers of the bearing bore 11 and of the receiving bore 14, a follower bore 23 is arranged in the pivot lever 10; this follower bore 23 is fixedly connected to the input member 26 forming a second axis of rotation 25 which can be in the form of a shaft provided with profilings for rotational entrainment and extending into a step-by-step mechanism 27. The rotational movement which is introduced by the input member 26 into the step-by-step mechanism 27 is transmitted by the step-by-step mechanism via an output shaft 28 to a control member of a non-illustrated adjusting device which can be, for example, the joint fitting for slant adjustment of the back rest of a vehicle seat. On the end of the pivot lever 20 projecting past the follower bore 23, the pivot lever 20 is provided with an angled return arm 29 which can be returned by a stationarily secured spring member 30 from any rotational position into the zero position. As is illustrated in FIG. 1, the spring member 30 can be a spiral spring 31 secured on the housing of the step-by-step mechanism which, by means of radially projecting spring fingers 32, engages opposed sides of the return arm 29 of the pivot lever 20. In the embodiment according to FIG. 1, between the pins 22 a follower bore 33 is provided in the pivot lever 20 with which a locking pin 34 of the step-by-step mechanism 27 can be actuated.

FIG. 1A illustrates the initial position, which is to be referred to as the zero position, in which the manual lever 13 as well as the transmission member 19 in the form of the pivot lever 20 are not subjected to any angular deflection. Only when the manual lever 13 is pivoted (lifting movement 70) by the angle αH illustrated in FIG. 1B—in the present case in the downward direction—a rotational movement 80 with a pivot angle αA results for the second axis of rotation 25 caused by the entrainment of the pins 22 on the pivot lever 20 functioning as the transmission member 19. The purely schematic illustration of FIG. 1B shows that the pivot angle αA of the pivot lever 20 is greater by a multiple in comparison to the pivot angle αH of the manual lever 13 pivoted about the first axis of rotation 24. The magnitude of the transmission depends on the ratio of the spacings between the axes of rotation 24 and 25, on the one hand, and the spacing between the axis of rotation 25 and the force action point on the loaded pin 22.

Figures 2, 2A, 2B:
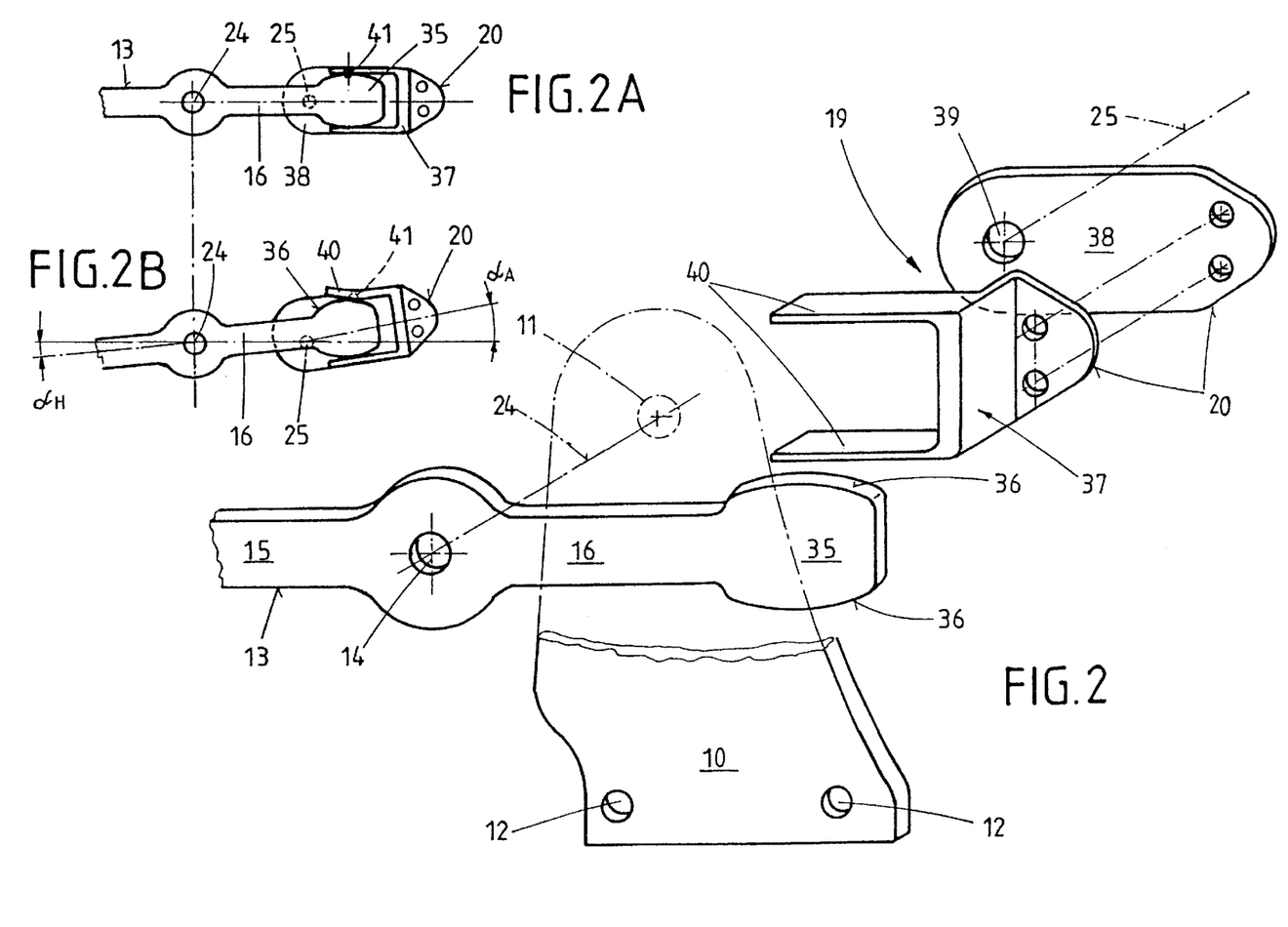
FIG. 2 shows a further embodiment of a lever drive whose transmission ratio during the lever pivot action is automatically continuously adjustable, also illustrated in a schematic, perspective illustration.
FIG. 2A illustrates the lever drive of FIG. 2 in a schematic side view at a reduced scale wherein the manual lever is in the zero position.
FIG. 2B shows the lever drive illustrated in FIG. 2A in a side view wherein, upon pivoting of the manual lever, the pivot lever has also been pivoted in a corresponding way.

In the embodiment illustrated in FIG. 2 the first axis of rotation 24 is also provided by the bearing of the manual lever 13 with its receiving bore 14 relative to the bearing bore 11 of the support arm 10. The load arm 16 of the manual lever 13 has at its free end an end portion 35 which at its upper side as well as its bottom side has control surfaces 36. These control surfaces 36 are engaged by a spring saddle 37 which is connected to a lever bracket 38 and together with it forms a pivot lever 20 which functions as the transmission member 19. In addition to the fastening bores for the spring saddle 37, the lever bracket 38 has a follower bore 39 which is engaged in a torque-transmitting way by the aforementioned input member of the step-by-step mechanism, not illustrated in FIG. 2, wherein the center of the follower bore 39 and the center of the input member define the second axis of rotation 25. The spring saddle 37 is U-shaped and has lateral legs 40 projecting relative to its stay which legs 40 contact the control surfaces 36 on the end portion 35 of the load arm 16 of the manual lever 13.

When, starting from the zero position of the manual lever 13 illustrated in FIG. 2A, the manual lever 13 is pushed downwardly by the angle αH, the contact point 41 of the control surface 36 moves on the spring leg 40 relative to the second axis of rotation 25 radially away from it into the position illustrated in FIG. 2B. When doing so, optionally with bending open of the upper of the spring leg 40 resting against the upper control surface 36, the pivot lever 20 belonging to the transmission lever 19 is pivoted upwardly about the second axis of rotation 25 in a counterclockwise direction into the angular position αA; at the same time, the second axis of rotation is also rotated by the angle αA. As illustrated particularly in FIG. 2B, the angle αA is greater by a multiple in comparison to the angle αH. Since upon further pivoting of the manual lever 13 the contact point 41 is also further moved in the radial direction, during the pivot movement of the manual lever 13 an automatic continuous change of the transmission ratio takes place so that the force ratios are changed also in the aforementioned sense.

Figure 3:
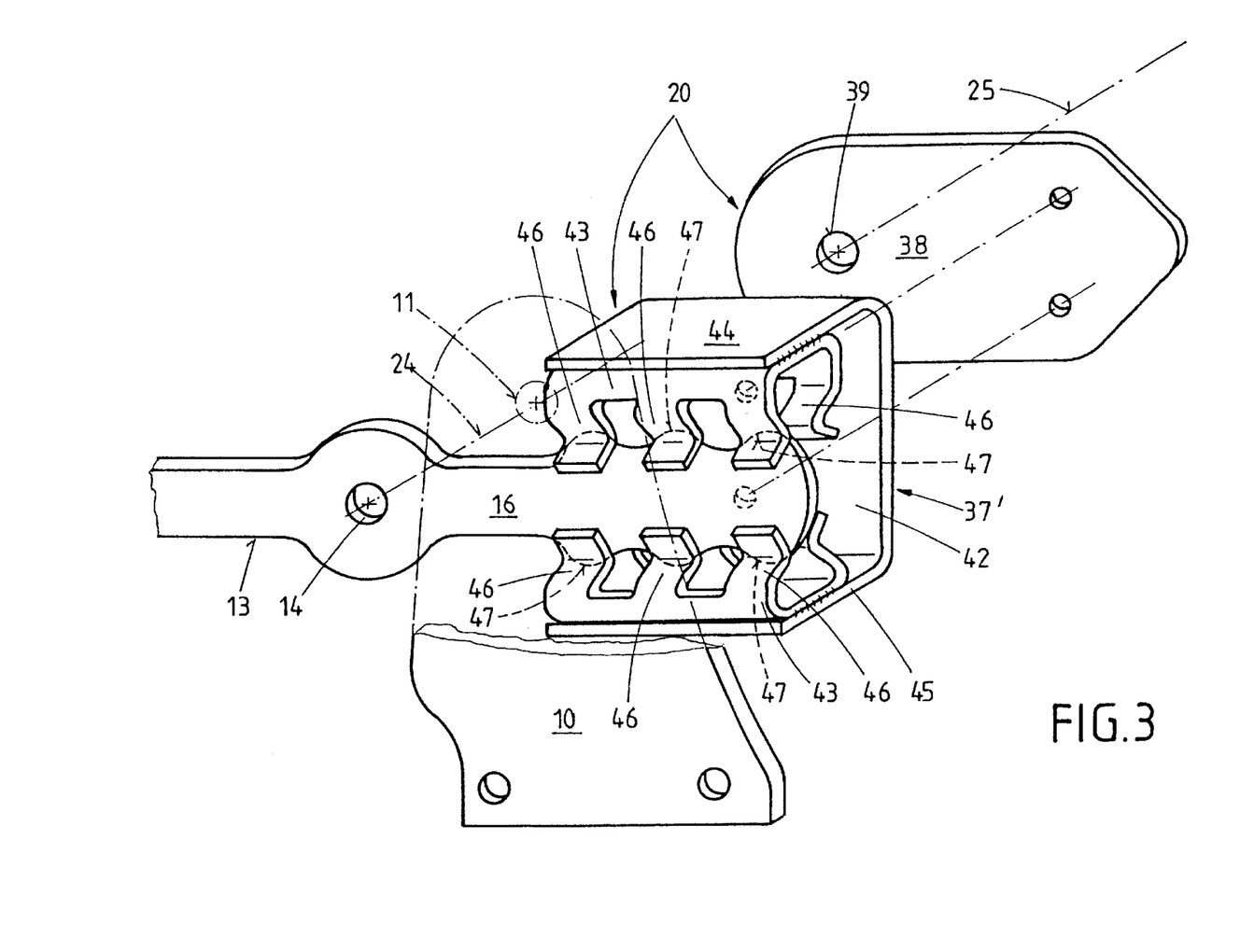
FIG. 3 shows a modification of the lever drive illustrated in FIG. 2 in a schematic, perspective illustration wherein the pivot lever is configured for a multi-step transmission ratio.

An embodiment modified relative to FIG. 2 is illustrated in FIG. 3. Here, a modified spring saddle 37' is secured on the lever bracket 38 which together with the lever bracket 38 forms the pivot lever 20. The spring saddle 37' is comprised of a U-shaped support body 42 and of multi-step spring brackets 43 wherein a spring bracket 43 is secured on each leg 44 or 45 of the support member 42. In the embodiment illustrated in FIG. 3, each spring bracket 43 has three spaced-apart, successively arranged bracket sections or contact sections 46 which are bracket-shaped and which can come into contact with the load arm 16 of the manual lever 13 when the load arm 16 pivots. In this connection, the contact section 46 closest to the first axis of rotation 24 is bent open farther than the following one and the latter, in turn, is again opened somewhat farther than the final one (46) which is positioned farthest away from the axis of rotation. In this connection, the load arm 16 advantageously has clamping projections 47 at the locations cooperating with the contact sections 46 which, upon corresponding loading, can penetrate between the respective contact sections 46 of the spring bracket 43 and thus pivot the pivot lever 20 by means of the spring bracket 38 such that the second axis of rotation 25 undergoes a corresponding angular rotation and transmits it also to the non-illustrated step-by-step mechanism. For a minimal force introduction by the adjusting device onto the lever drive upon deflection of the manual lever 13, only the forward contact section 46, positioned above or below the load arm 16 depending on the pivot direction of the manual lever, is actuated for a pivot movement by the corresponding clamping projection 47. Only when a greater force acts on the pivot lever 20, the clamping projections 47 closest to the first axis of rotation 24 penetrates between the spring legs of the corresponding first contact section 46 so that the subsequent second contact section is loaded by the load arm 16 until the force is increased such that finally also the contact section 46 farthest from the first axis of rotation 24 is loaded. Accordingly, with this solution a changeable transmission ratio becomes effective, however, not continuously but so as to be changed in steps. Otherwise, the angular ratios which have been described in the preceding embodiments are also present.

Figures 4, 4A:
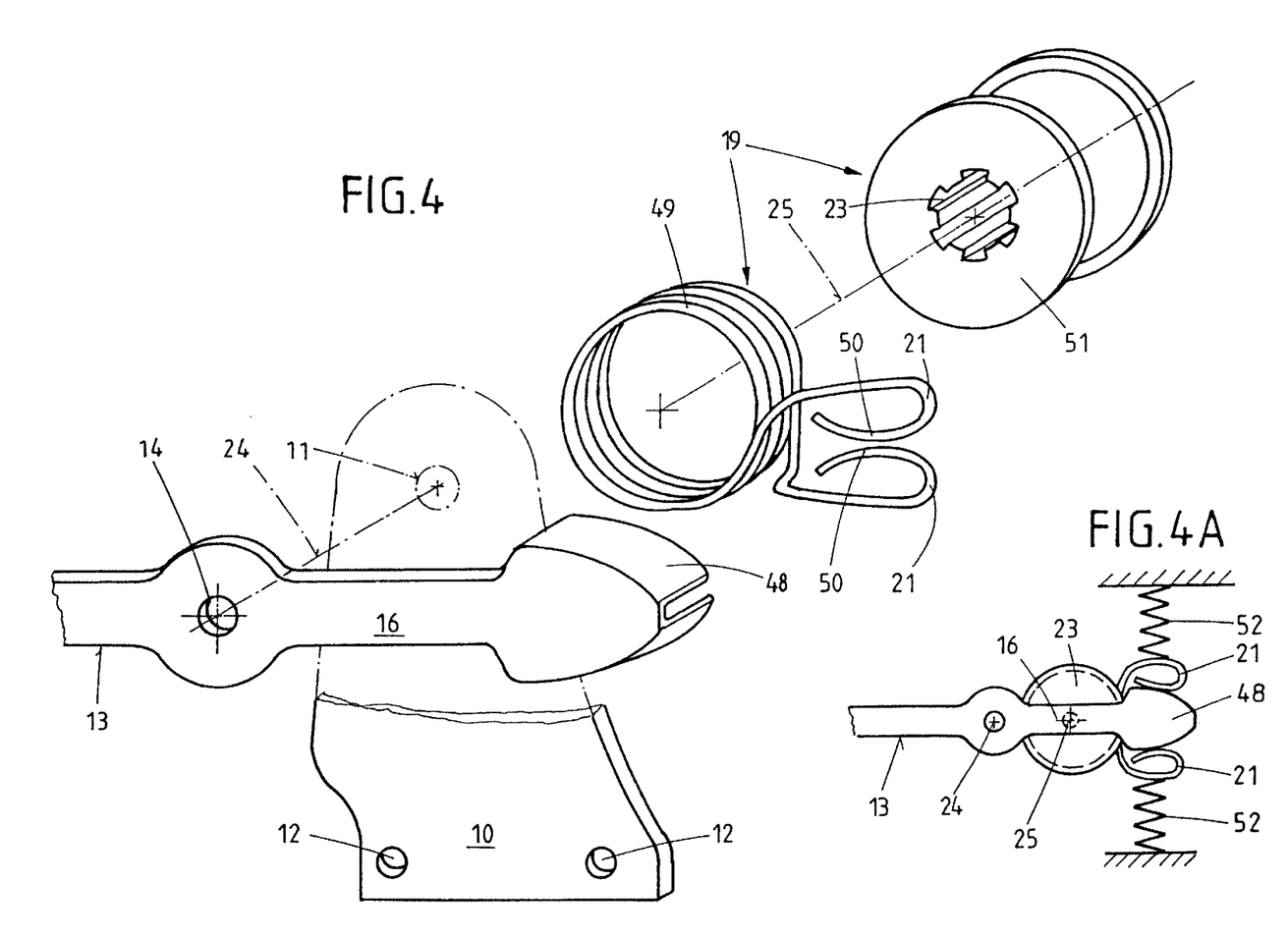
FIG. 4 is a further embodiment of a lever drive, also in a schematic, perspective illustration wherein the step-by-step mechanism has been integrated into the transmission member by using a wrap spring.
FIG. 4A shows the step-by-step mechanism illustrated in FIG. 4 in a schematic side view at a reduced scale in which the load arm of the manual lever provided with a curved head is in the zero position.

In the embodiment illustrated in FIGS. 4 and 4A the manual lever 13 is again supported on a first axis of rotation 24 on the stationary support arm 10. The load arm 16 of this manual lever 13 has at its free end a curved head 48 which engages between the spring ends 50 of the wrap spring forming elastic followers 21. The wrap spring 49, in turn, is arranged on the mantle of a spool body 51 and entrains it by friction as a result of its spring force in the corresponding rotational direction in the case of pivoting of one follower 21. The spool body 51 has at its center, for example, a profiled follower bore 23 which, in turn, receives an input member for the adjusting device. The center of this follower bore is to be viewed as the second axis of rotation 25 which is arranged at a spacing from the first axis of rotation 24 supporting the manual lever 13 on the support arm 10. Each follower of the wrap spring 49 is loaded for the purpose of zero position return by a stationarily supported spring member 52 (FIG. 4a). Upon introduction of a lifting movement into the manual lever 13, the respective follower 21 of the wrap spring 49 is pivoted via the curved head 48 so that a rotational entrainment of the spool body 51 in the corresponding pivot direction is realized and, moreover, the drive member forming the second axis of rotation 25 is also rotated. By means of the curve of the curved head 48 and the correspondingly shaped spring end 50, an automatic continuous change of the transmission ratio, based on the deflection angle of the manual lever 13, to the deflection angle of the follower 21 of the wrap spring loaded by the curved head 48 takes place during the pivot movement of the manual lever 13. When the manual lever 13 after deflection is set to be free of force loading, a return of the respective follower 21 and thus a return of the manual lever 13 into the position illustrated in FIG. 4 and FIG. 4A is realized without the spool body 51 being rotated, at least when a self-locking adjusting device is arranged downstream of the spool body 51 and, in this way, the input member connected to the follower bore 23 is secured.

The embodiment illustrated in FIG. 5 is again a modification of the embodiment illustrated in FIGS. 4 and 4A. In this case, the manual lever 13 is also supported by means of the first axis of rotation 24 on the stationarily arranged support arm 10. The second axis of rotation 25 is formed by an input member, not illustrated in FIG. 5, arranged in the follower bore 23 wherein the follower bore 23 is a component of a drum-shaped cup 53 in whose interior a wrap spring 49 is arranged. In this connection, the wrap spring 49 and the drum-shaped cup 53 form the transmission member 19. This wrap spring 49 has also spring ends forming followers 21 which are engaged by a pawl 54 at the end of the load arm 16 of the manual lever 13. The function of this embodiment is realized in the same way as in the embodiment of FIGS. 4 and 4A.

Figure 5:
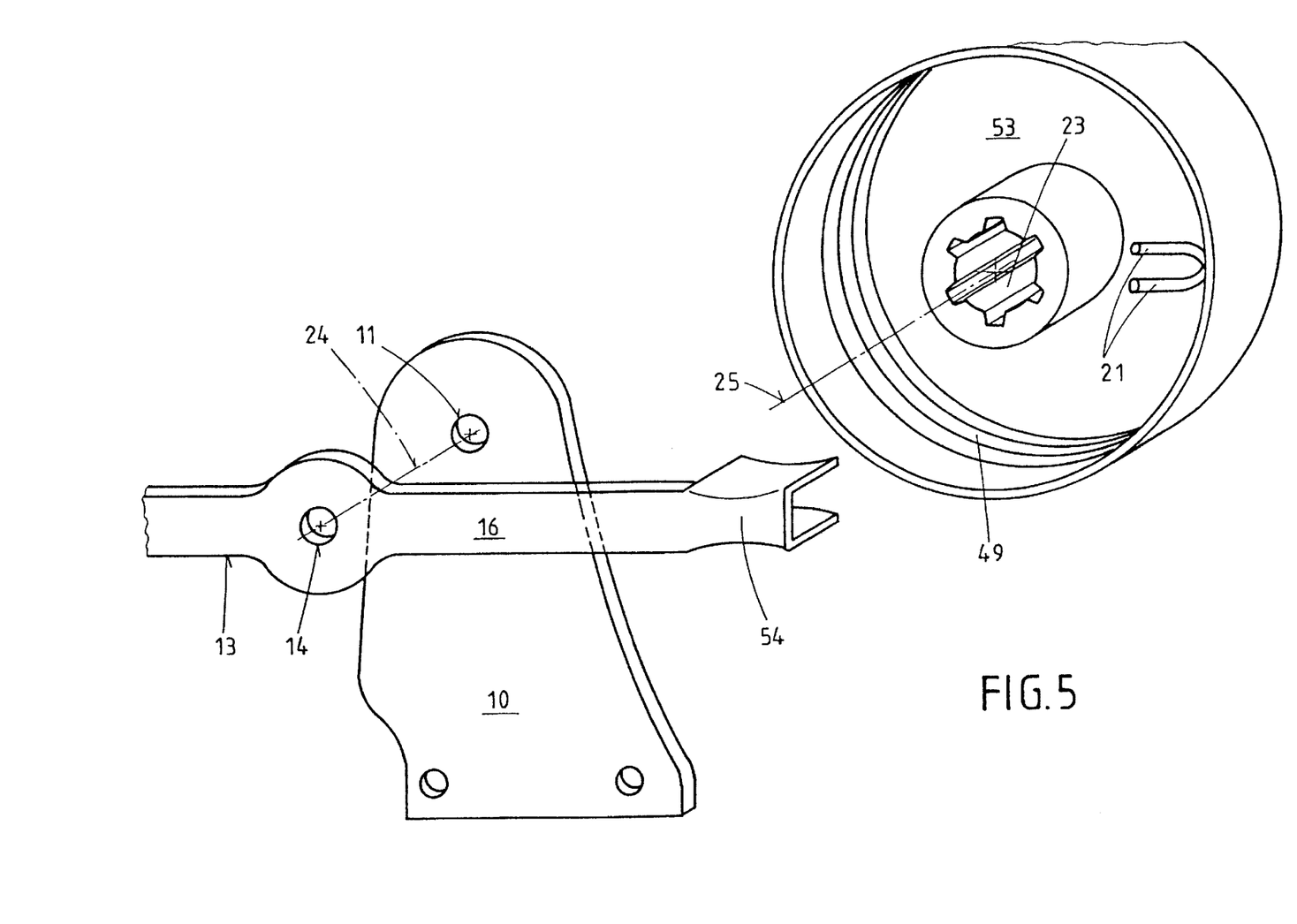
FIG. 5 shows a further embodiment of a lever drive in a schematic, perspective illustration wherein a wrap spring actuatable by the load arm of the manual lever is arranged within the interior of a drum-shaped cup.
Figure 6:
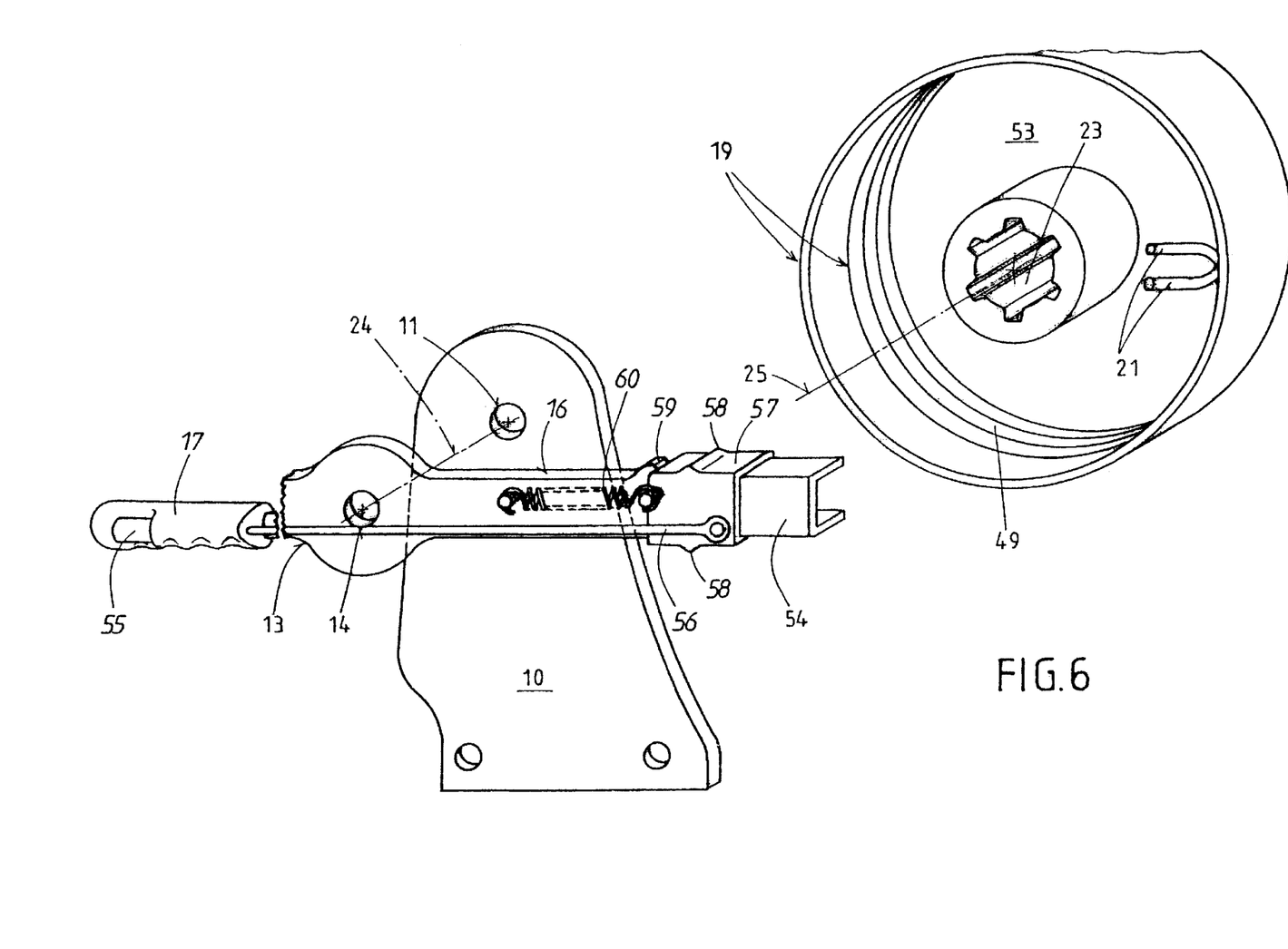
FIG. 6 shows an embodiment, modified relative to FIG. 5, in an analog illustration in which the transmission ratio of the lever drive can be selected.

The embodiment of FIG. 6 illustrates a modification of the embodiment of FIG. 5. The pawl 54 is configured as a guide rail on the load arm 16 of the manual lever 13 on which a connecting link bracket 57 is slidably arranged wherein the sliding stroke in the direction toward the first axis of rotation 24 is limited by a stop 59 on the load arm 16. A sliding linkage 56 is connected to the connecting link bracket 57 and is connected to a pushbutton 55 arranged on the grip part 17. When pressing the pushbutton 55, the bracket 57 with its contact points 58, in the form of beads configured for contacting the followers 21, is moved relative to the second axis of rotation 25 to the rear so that the transmission ratio changes. Accordingly, the operator can select the transmission ratio by means of the actuating device comprised of the components 55, 56, 57 and maintain it by pressing the pushbutton 55. Only after releasing the pushbutton 55, the bracket 57 is returned into the initial position illustrated in FIG. 6 by means of the restoring spring 60 arranged between the bracket 57 and the load arm 16 of the manual lever 13. The restoring spring could, of course, also be integrated for loading the pushbutton 55 within the grip 17.

As already mentioned, the illustrated embodiments of the subject matter of the invention are only to be understood as examples. The invention is not limited to these embodiments. Instead, several configurations and modifications of the subject matter of the invention are conceivable. In particular, all features which are disclosed in the drawings and in the description are important to the invention even though they are not expressly claimed in the claims.

While specific embodiments of the invention have been shown and described in detail to illustrate the inventive principles, it will be understood that the invention may be embodied otherwise without departing from such principles.

What is claimed is:

1. A manual lever drive for a seat for converting a lifting movement into a discontinuous rotational movement; the manual lever drive comprising:

a support arm;

a step-by step mechanism having an output member and an input member;

a transmission member connected to the input member for torque transmission onto the input member;

a manual lever connected to the support arm so as to pivot about a first axis of rotation;

the manual lever configured to actuate the transmission member;

the transmission member arranged on the input member providing a second axis of rotation;

wherein a pivot angle of the manual lever imparts to the transmission member a pivot movement increasing a corresponding pivot angle of the second axis of rotation;

wherein the transmission member is a pivot lever fixedly connected to the input member, wherein the manual lever comprises a load arm and wherein the pivot lever comprises followers arranged on opposed sides of the load arm, wherein the manual lever pivots the transmission member in one or the other rotational direction by the load arm acting on the followers.

2. The lever drive according to claim 1, wherein the load arm has control cutouts and wherein the followers of the pivot lever are pins projecting away from the pivot lever and configured to contact the control cutouts of the load arm.

3. The lever drive according to claim 1, wherein the pivot lever has a return arm configured to be loaded by a stationary spring member and to be returned from any pivot position into a zero position.

4. The lever drive according to claim 3, wherein the spring member is a spiral spring attached to a housing of the step-by-step mechanism, wherein the spiral spring has radially projecting spring fingers positioned on opposed sides of the return arm.

5. The lever drive according to claim 1, wherein the pivot lever comprises a spring saddle and a lever bracket connected to the spring saddle, wherein the spring saddle has two spaced apart spring legs and wherein the load arm has an end portion comprising curved control surfaces, wherein the spring legs receive the end portion of the load arm and contact the control surfaces.

6. The lever drive according to claim 5, wherein the spring saddle is secured on the lever bracket and comprises a U-shaped support body with lateral legs and further comprises multi-step spring brackets with contact sections connected to the lateral legs of the U-shaped support body, respectively, and forming the spring legs, wherein the contact sections of the multi-step spring brackets continuously engage the end portion of the load arm when the load arm pivots.

7. The lever drive according to claim 6, wherein each one of the spring brackets has three of the contact sections arranged spaced apart and successively in a direction of longitudinal extension of the load arm and narrowing continuously, wherein the end portion of the load arm has clamping projections, and wherein the three contact sections engage the clamping projections with increasing clamping force.

* * * * *